United States Patent [19]

Frenker-Hackfort

[11] Patent Number: 4,747,261
[45] Date of Patent: May 31, 1988

[54] LOAD TRANSMITTING CHAIN WITH PLATE LINKS

[75] Inventor: Ludger Frenker-Hackfort, Herkersdorf, Fed. Rep. of Germany

[73] Assignee: Rexnord Kette GmbH & Co KG, Betzdorf, Fed. Rep. of Germany

[21] Appl. No.: 905,870

[22] Filed: Sep. 10, 1986

Related U.S. Application Data

[63] Continuation of Ser. No. 691,661, Jan. 15, 1985, abandoned.

[30] Foreign Application Priority Data

Jan. 21, 1984 [DE] Fed. Rep. of Germany ....... 3402102
Aug. 25, 1984 [DE] Fed. Rep. of Germany ....... 3431317

[51] Int. Cl.⁴ .............................................. F16G 13/08
[52] U.S. Cl. .......................................... 59/84; 59/78; 59/5; 59/93; 474/707; 198/851
[58] Field of Search .................. 59/4, 5, 6, 78, 84, 59/90, 91, 900, 901, 35.1, 93; 474/207, 208, 212, 226, 234, 236, 218; 198/849, 850, 851, 852

[56] References Cited

U.S. PATENT DOCUMENTS

| | | | |
|---|---|---|---|
| 694,533 | 3/1902 | Cross | 474/226 |
| 1,882,855 | 10/1932 | Melin | 198/851 |
| 2,722,843 | 11/1955 | Edwards, Jr. | 59/91 |
| 2,723,866 | 11/1955 | Warshaw | 59/78 |
| 2,945,391 | 7/1960 | Cookson | 59/78 |
| 2,951,578 | 9/1960 | Hibbard | 198/851 |
| 2,954,113 | 9/1960 | Hibbard et al. | 198/851 |
| 3,104,481 | 9/1963 | George et al. | 59/35 CP |
| 3,842,968 | 10/1974 | Owens | 198/851 |
| 3,944,059 | 3/1976 | Garvey | 198/851 |
| 4,271,960 | 6/1981 | Chalich | 198/851 |
| 4,301,915 | 11/1981 | Michalik et al. | 198/851 |

FOREIGN PATENT DOCUMENTS

| | | | |
|---|---|---|---|
| 2035508 | 11/1979 | United Kingdom | 59/78 |
| 504901 | 2/1976 | U.S.S.R. | 59/78 |

OTHER PUBLICATIONS

"Flyerketten", Rexnord, p. 12.
"Feinmechanische Bavelmente", prof-Ing Siegfried Hildebrand, 1972, pp. 604, 605.
"Rex" Power Transmission and conveying Components Rexnord Inc. pp. A-10, A-11, A-16, A-17, A-18 (catalog R85).

*Primary Examiner*—David Jones
*Attorney, Agent, or Firm*—Toren, McGeady & Associates

[57] ABSTRACT

A load transmitting chain (1) comprises a series of links each formed by a number of link plates (2) arranged side by side and meshing with the link plates of the adjacent link to which they are pivotally connected by link pins (4). The chain is intended for use in transmitting force from a hydraulic cylinder having a piston rod, for example in a fork-lift truck. To avoid damage to the piston rod by contact of the links (2), which are of steel, with it, the chain is provided with a row of additional protective link plates (5) which are sandwiched between the link plates (2) and have projecting portions (11). The protective link plates (5) are made of plastics material and the projecting portions (11) act as buffers so that they come into contact with the piston rod without causing damage and prevent direct contact between the steel link plates (2) and the piston rod.

12 Claims, 3 Drawing Sheets

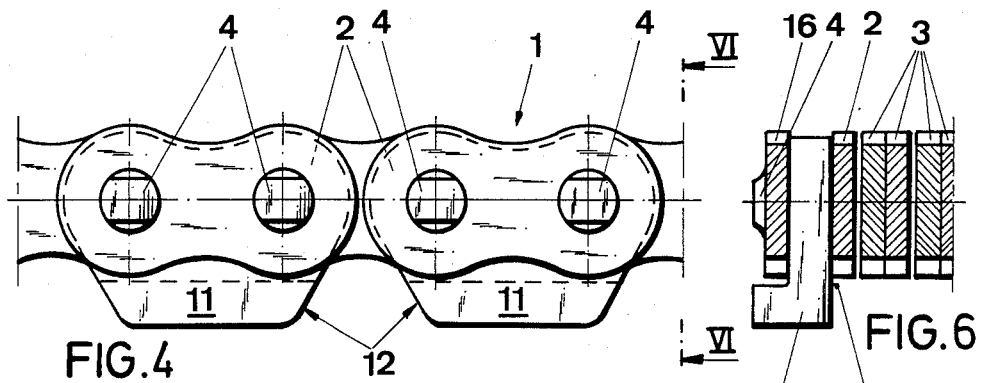
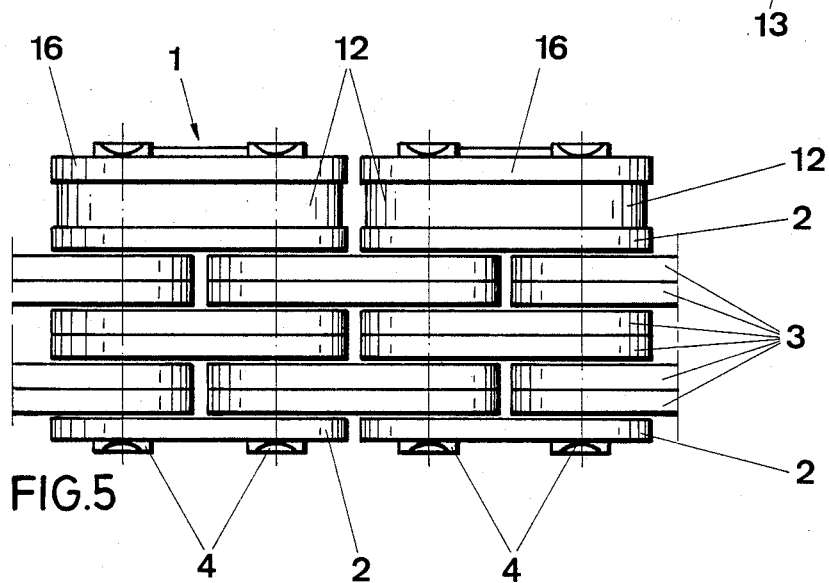
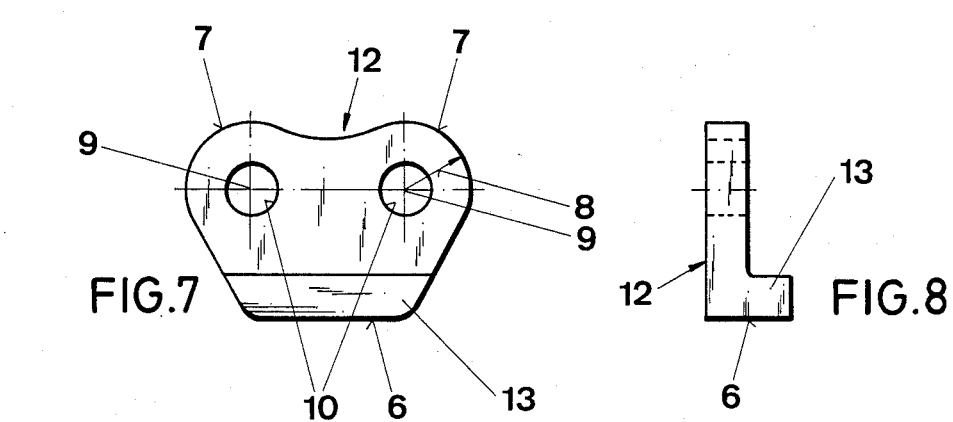

LOAD TRANSMITTING CHAIN WITH PLATE LINKS

This is a continuation of application Ser. No. 691,661, filed Jan. 15, 1985, now abandoned.

This invention relates to load transmitting chains especially all types of flyer chains such as are used as load transmitting chains in fork-lift trucks, with any combination and number of plate links in each link of the chain.

The raising and lowering of the lifting fork of a fork-lift truck is effected by means of a hydraulic cylinder, which reversibly loads load-transmitting chains which are constructed as flyer chains. Two drive arrangements are common, namely firstly two chains, one running to the right and the other to the left of the cylinder. This however interferes with the view of the driver of the truck. To overcome this and improve the view of the driver, it is furthermore known to provide only one chain in the center of the width of the truck adjacent the hydraulic cylinder or laterally alongside the lifting cylinder and/or a lifting mast of the truck. This has the disadvantage, however, that the chain which is under tension during lifting of the load and movement of the truck swings to and fro and tends to damage the piston rod of the cylinder with the hardened metal side link plates of the link of the chain. This damage also cannot be avoided with plastics clips fitted onto the side bars, because the clips are only snapped on and easily come off.

The object of the present invention is to provide a load transmitting chain in which each link comprises a number of similar link plates arranged side by side and which does not have the aforementioned disadvantages; and which independently of the spatial arrangement and number of chains provided in a fork lift truck assures adequate protection of the piston rod of the hydraulic cylinder and does not adversely affect the running properties of the chain and its engagement with the associated guiding toothed or non-toothed wheels around which the chain may extend.

To this end, according to this invention, a load transmitting chain, in which each link comprises a number of similar link plates arranged side by side and meshing or interleaved with link plates of adjacent links to which they are connected by link pins, is characterised in that protective link plates each having a portion which projects beyond the edges of the similar link plates at at least one side of the chain, are fixed between or beside the similar link plates of the links.

In use, the portions of the protective link plates projecting at at least one side of the chain, that is the side remote from that which in use engages the chain guiding wheel or wheels come into contact with the piston rod of the hydraulic cylinder as the chain vibrates and thus act as deflectors. They may also fulfill a guiding function, since the oscillating of the chain is limited and the movement of the chain in the prescribed movement path is assisted.

Centrally mounted protective link plates may be fixed between intermediate link plates and outer link plates, so that the width of the chain in the direction of the link pins can be modified by varying the number of intermediate link plates.

Substantially trapezium-shaped protective link plates having a straight base edge on the projecting portion and upper corner regions rounded to a circular arc, which decrease the length of the longer side of the protective plate link and have bores for receiving the hinge pins of the chain at the centers of the arcs, maintain excellent running behaviour of the chain. In the region of engagement of the chain with its guiding wheels i.e. at the side of the links remote from the projecting portions, the protective links preferably have a concave profile corresponding to that of the other similar link plates and the running properties of the chain are not adversely affected.

The protective link plates must of course be made of protective material which will not damage the piston rods of the hydraulic cylinders when they come into contact with them, and with protective link plates of plastics material, impact-resistant material should be used, such as polyacetal or low-pressure polyethylene. The protective link plates may have flanges on the projecting portions and, for example, have an L-shaped cross-section. In this way the protective effect can be optimised. When the protective link plates have their flanges directed towards the piston rod, when the chain oscillates and executes circulating movements about the longitudinal axis of the chain depending upon the lifting height and hence upon the free length of the chain, the flanges very soon strike against the piston rod and this promptly prevents large oscillating amplitudes of the chain from occurring. This promotes straight running of the chain in the prescribed movement path. The projecting portions of the protective link plates may, in addition, be used for guiding the chain over the guide wheels of the fork-lift truck. The projecting portions can engage for this purpose in a machined groove in the guide wheel. The guiding of the chain by means of the protective link plates can also be achieved by the plates being seated on one side by the guide wheel and on the opposite side by a guide strip. In both cases, flanged discs for the lateral guidance by the guide wheel can be dispensed with.

If protective link plates have projecting portions projecting from both sides of the chain links, that is beyond both edges of the similar link plates, the oscillations and tilting of the chain in both directions about the longitudinal axis can be equalised. The protective link plates may have a channel-shaped cross-section with flanges on both projecting portions at both sides of the chain.

Oscillations which adversely affect the running properties of the chain may be equalised preferably by means of protective link plates disposed externally on link pins which project at least at one side of the chain. The protective link plates, disposed on the side of the chain adjacent the piston rod, come into contact with the piston rod after only short oscillating movements or possible tilting of the chain through small angular distances about the longitudinal axis of the chain, so that an undesired chain position is influenced and corrected as rapidly as possible.

Fixing elements which bear externally against the protective link plates and can be attached to the projecting portions of the link pins by riveting or as a press fit, can ensure that the assembled chain links and protective link plates hold together. The fixing elements may, for example, consist of washers, bars or metal plates.

The protective link plates may also be fitted symmetrically on both sides of the chain. The life of the protective link plates can then be extended by turning the chain around. In particular, channel-shaped protective link plates disposed on one side of the chain also make possible turning of the chain in the apparatus, e.g. a fork-lift truck, thus bringing the previously less affected side of the protective link plates into the most affected direction.

A number of examples of chains in accordance with the invention will now be described with reference to the accompanying drawings in which:

FIG. 4 is a side view of a second example;

FIG. 5 is a plan view of the chain shown in FIG. 4;

FIG. 6 is a cross-section through the chain shown in FIG. 4 as seen in the direction of the arrows on the line VI—VI in FIG. 4;

FIG. 7 is a side view of one of the protective link plates of the chain shown in FIGS. 4 to 6;

FIG. 8 is an end view of the link plate shown in FIG. 7;

Figure 1:
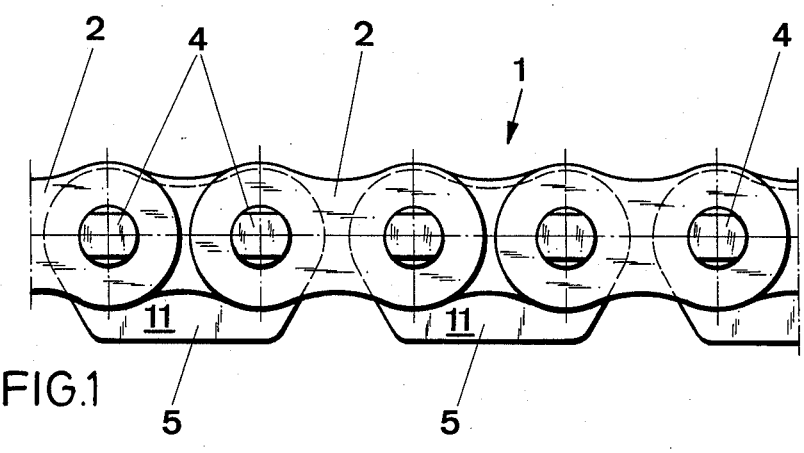
FIG. 1 is a side view of one example.
Figure 2:
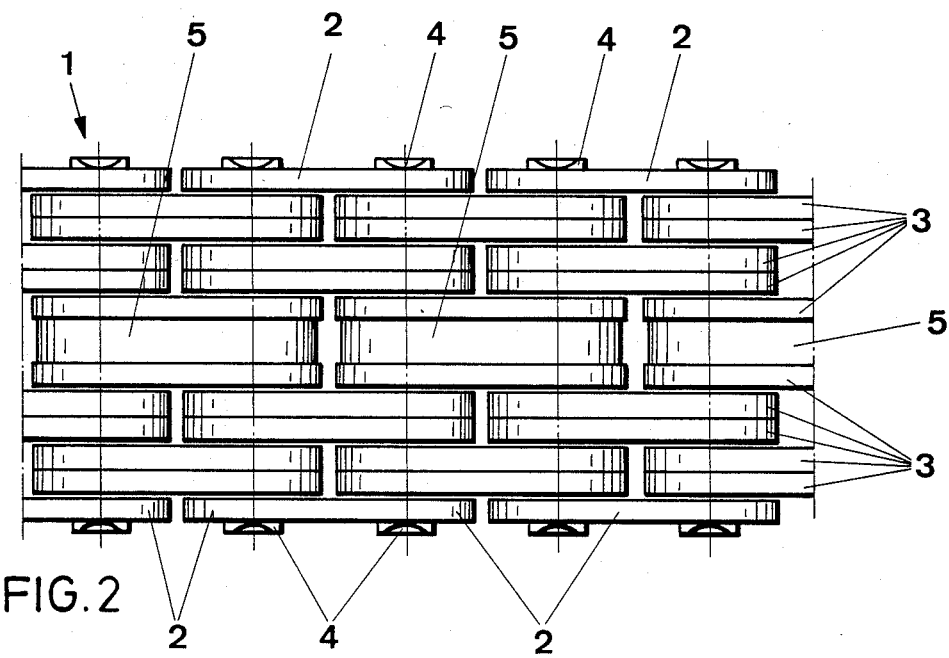
FIG. 2 is a plan view of the chain shown in FIG. 1.

All the examples of the chain 1 consist of chain links which comprise outer link plates 2 and intermediate link plates 3 made of steel and the links are connected together in an articulated manner by pins 4, e.g. riveted pins. The plates 2, 3 hold between them or beside them a protective link plate 5 of plastics material. In the first example the plates 5 are fixed centrally in the chain 1.

Figure 3:
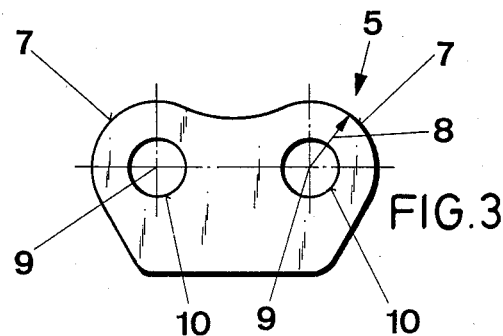
FIG. 3 is a side view of one of the protective link plates of the chain shown in FIGS. 1 and 2.

In the first example, the link plate 5 is generally trapezium-shaped and has a straight base edge 6 and also rounded parts 7 of circular arc shape in the upper corner regions. Starting from the base edge 6 which forms the shorter side of the trapezium, the lateral edges of the plate 5 initially run outwards at an angle of approximately 30° to the vertical as seen in FIG. 3 before leading into the rounded parts 7, which extend through circular arcs of approximately 90°. The rounding radii 8 are approximately equal to the radii of the rounded ends of the link plates 2, 3 of the chain 1. At the center points 9 of the rounding radii 8 of the protective plates 5 there are bores 10 for the link pins 4, which are inserted to connect the links to each other.

The plates 5 incorporated into the chain (see FIG. 1 and FIG. 4) project at one side of the chain with portions 11 extending beyond the edges of the chain link plates 2 and 3, whereas in the remaining part of the chain 1 they register accurately with the plates 2 and 3.

Figures 9, 11:
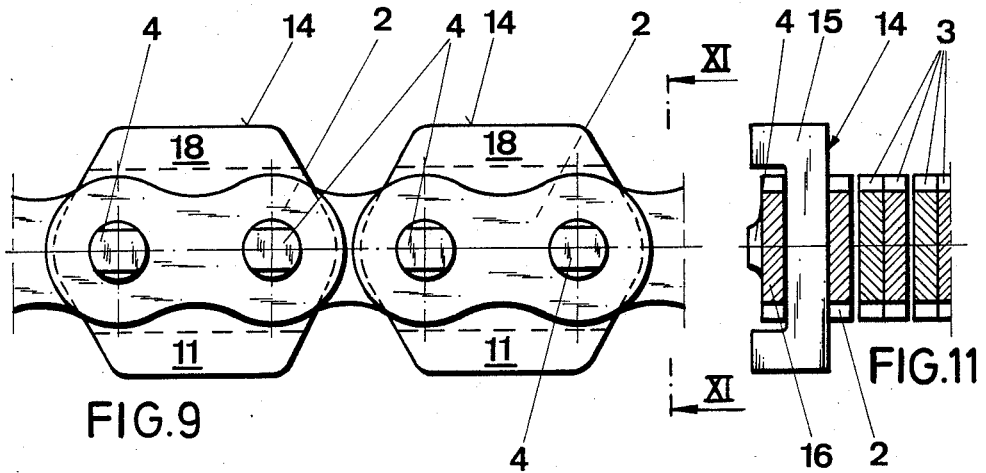
FIG. 9 is a side view of a third example.
FIG. 11 is a cross-section through the chain shown in FIG. 9 as seen in the direction of the arrows on the line XI—XI in FIG. 9.
Figure 10:
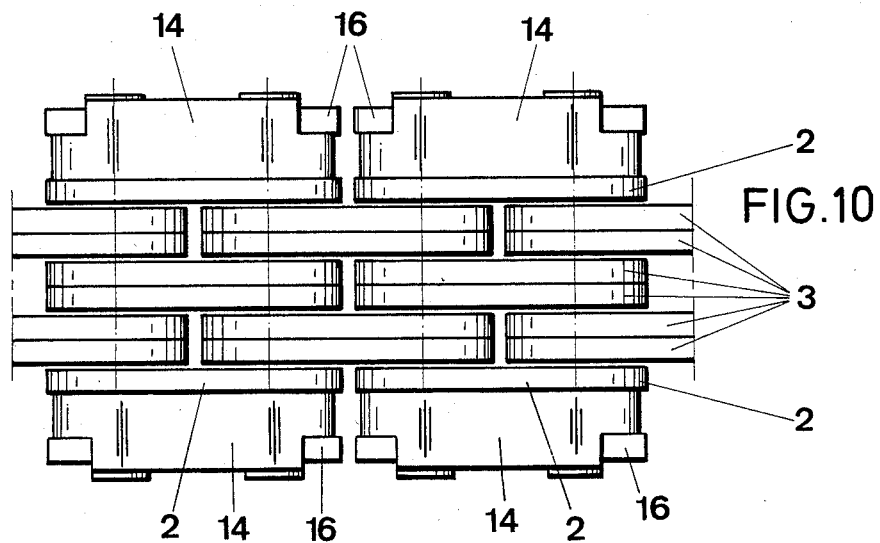
FIG. 10 is a plan view of the chain shown in FIG. 9.

In the examples of FIGS. 4 and 9, the link pins 4 project at one side of the chain and carry, in the example of FIG. 4, L-shaped protective plates 12 having outwardly extending flanges 13 and, in the example of FIG. 9, channel-shaped protective plates 14 having outwardly extending flanges 15 above and below the projecting portions 11. The L-shaped protective plates 12 and channel-shaped protective plates 14 are mounted on link pins 4 projecting laterally outwardly from the adjacent outer link plates 2. Fixing elements 16, constructed as outer link plates and mounted on the projecting link pins 4, bear from outside against the protective link plates 12, 14 on the laterally outwardly projecting link pins 4 and secure them in position and also secure the assembled chain links.

The protective link plate 12 of the L-shaped section shown in FIGS. 7 and 8 again has a substantially trapezium-shaped outline and has a straight base edge 6 and circular arc-shaped rounded parts 7 in the upper corner regions. The protective link plates 12 are incorporated into the chain 1 in such a way that their flanges 13, disposed on the portions 11 which project at one side beyond the chain links, are directed outwards away from the chain, that is towards the expected impact or contact.

Figures 12, 13:
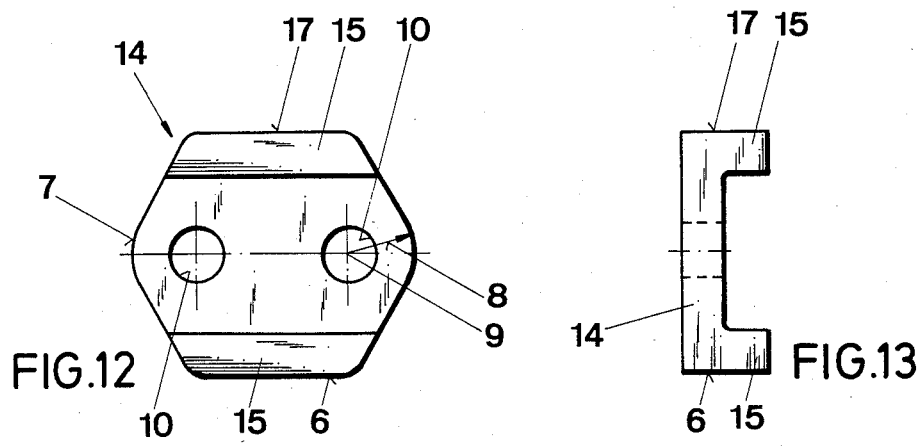
FIG. 12 is a side view of one of the protective links of the chain shown in FIGS. 9 to 11.
FIG. 13 is an end view of the plate shown in FIG. 12.

The external outline shape of the channel-section protective link plate 14 illustrated in FIGS. 12 and 13 can, by contrast, be compared with a hexagon, and it has a straight lower base edge 6 and a straight upper edge 17. It also has corner parts which, situated in the central plane of the plate, are provided with rounding radii 8 which are approximately equal to the radii of the round-ended plates 2, 3, 16 of the chain 1. At the center points 9 of the rounding radii 8, there are bores 10 for receiving the link pins 4. The protective link plates 14 (see FIG. 9) project beyond the chain on both sides with projecting portions 11, 18 respectively, the flanges 15 of the protective plates 14 projecting outwards away from the chain, that is towards the anticipated contact positions.

I claim:

1. In an elongated load transmitting flyer chain for use as a drive chain in a fork-lift truck where an hydraulic cylinder with a piston rod effects the raising and lowering of a lifting fork of the fork-lift truck, said flyer chain comprising a plurality of links extending one after the other in the elongated direction of said chain with each said link having a pair of oppositely facing outer sides and each outer side of said links having a first edge and a second edge extending in the elongated direction of said chain, each of said links including a plurality of similar metallic first link plates arranged side by side and interleaved with said first link plates of adjacent said links, said first link plates each having a pair of oppositely facing side surfaces extending in the elongated direction of said chain and each side surface having bordering edges including a first edge and a second edge extending in the elongated direction of said chain, and axially extending link pins extending transversely of the elongated direction of and through said first link plates and pivotally connecting adjacent said link together, the improvement comprising at least a part of said bordering edges of said first link plates being of curviform shape, a plurality of non-metallic protective second link plates formed of an impact resistant plastics material and extending in the elongated direction of said chain and being in parallel relation with said first link plates for protecting the piston rod of the hydraulic cylinder, said metallic first link plates including outer first link plates forming the outer sides of said link and intermediate first link plates located inwardly of said outer first link plates, said second link plates having oppositely facing side surfaces located inwardly within each said link from said outer first link plates, said link pins extending through said second link plates, said side surfaces of said second link plates disposed generally parallel to said side surfaces of said first link plates and said side surfaces of said second link plates having bordering edges corresponding in part to the curviform shape of at least a part of the bordering edges of said first link plates and said curviform bordering edges being in general alignment in the axial direction of said link pins, at least one of said side surfaces of said second link plates being adjacent one of said intermediate first link plates and the adjacent surfaces of said second link plates and intermediate first link plates being planar and in parallel relation, each of said protective second link plates including an integral portion which projects outwardly from said second link plate extending past at least one of said first and second edges of said similar first link plates transversely of the axial direction of said link pins, and said protective second link plates being incorporated into adjacent interconnected links for affording a continuous protection along the length of said chain so that said protective second link plates having the projecting portion thereof projecting toward a piston rod of a hydraulic cylinder on the lifting fork prevents contact between the metallic surfaces of said chain and the piston rod and said projecting portion of said protective second link plates having a dimension in the axial direction of said link pins significantly smaller than the corresponding dimension of said links so that said intermediate first link plates adjacent at least one side surface of said protective second link plates are uncovered by said second link plates.

2. A chain as claimed in claim 1 in which there is at least one row of said protective second link plates fixed between a pair of said similar intermediate first link plates and inwardly of the outer sides of said chain.

3. A chain as claimed in claim 1, in which there is at least one row of said protective second link plates extending in the elongated direction of said chain fixed to said outer first link plates inwardly of one outer side of said chain.

4. A chain as claimed in claim 2, in which said side surfaces of said protective second link plates are generally trapezium-shaped and each of said protective second link plates includes one of a first and second edges thereof extending in the elongated direction of said chain and defining a straight base edge on said projecting portion of said protective second link plate, corner parts of the other one of said first and second edges of said protective link plate being rounded to circular arcs which decrease the length of the other one of said sides of said trapezium-shape remote from said straight base edge and means defining bores for receiving said link pins through said protective link plates at center points of said circular arcs.

5. A chain as claimed in claim 1, in which said protective second link plates are formed of plastics material.

6. A chain as claimed in claim 1, in which said protective second link plates each include a flange extending laterally from said projecting portion of said protective second link plate.

7. A chain as claimed in claim 6, in which each of said protective second link plates is of L-shaped cross-section.

8. A chain as claimed in claim 1, in which each of said protective second link plates includes two projecting portions projecting beyond the first and second edges of said similar first link plates, and further comprising laterally extending flanges projecting outwardly from said projecting portions of said protective link plates in the direction parallel to the axes of said link pins at both outer sides of said chain.

9. A chain as claimed in claim 8, in which said protective link plates are of channel-shaped cross-section.

10. A chain as claimed in claim 3, in which said link pins include parts projecting laterally from said outer first link plates adjacent at least one outer side of said chain and said protective second link plates are disposed externally of said intermediate first link plates at said at least one outer side of said chain on said link pins and inwardly of said outer first link plates.

11. A chain as claimed in claim 10, wherein said at least one outer first link plates on said at least one outer side of said links are fixing elements and are mounted on the ends of said laterally projecting parts of said link pins, said fixing elements bearing externally against said protective link plates to hold said protective second link plates in position on said link pins.

12. A chain as claimed in claim 10, further comprising laterally projecting parts of said link pins projecting from said outer first link plate adjacent the other outer side of said chain and further protective second link plates disposed externally of the adjacent said intermediate first link plate at the other outer side of said chain on said link pins, whereby there are said protective second link plates disposed symmetrically at both outer sides of said chain.

* * * * *